Aug. 5, 1969 P. KUMMER 3,459,076
AUTOMATIC LATHE
Filed March 21, 1966 5 Sheets-Sheet 1
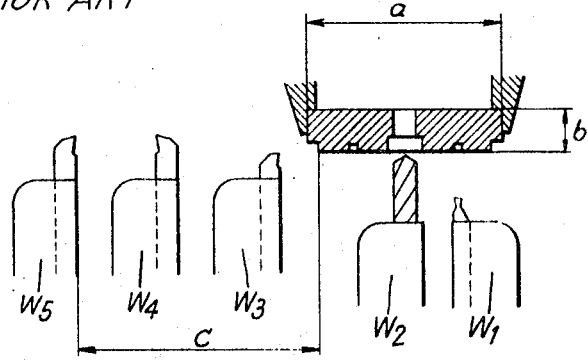
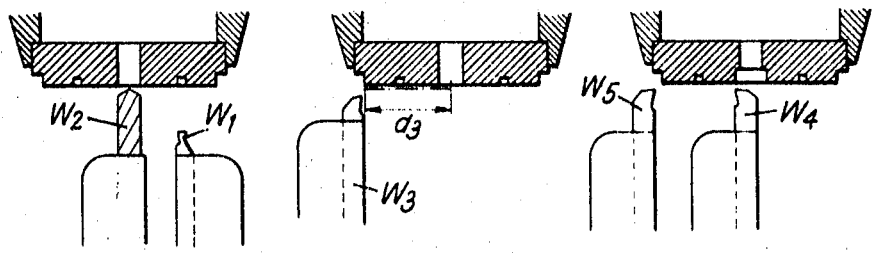
INVENTOR:
PIERRE KUMMER
By Werner W. Kleeman
His Attorney

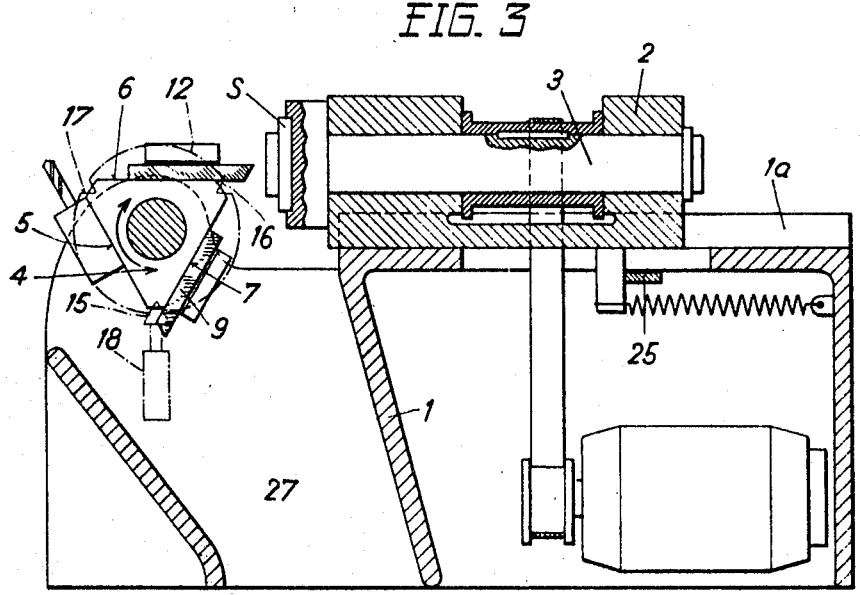
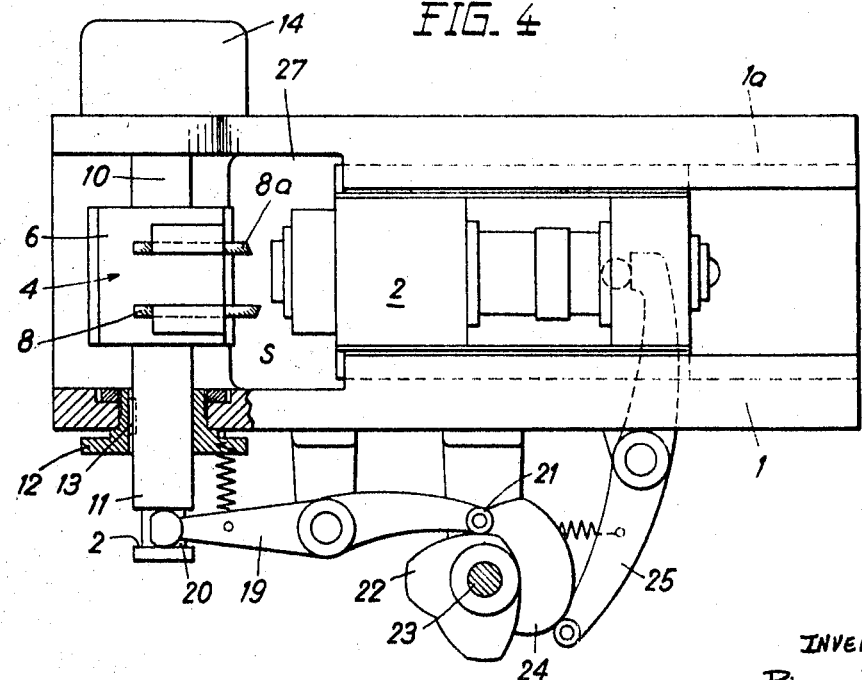

United States Patent Office 3,459,076
Patented Aug. 5, 1969

3,459,076
AUTOMATIC LATHE
Pierre Kummer, Rue des pres 20,
Tramelan, Bern, Switzerland
Filed Mar. 21, 1966, Ser. No. 535,905
Claims priority, application Switzerland, Mar. 31, 1965,
4,416/65
Int. Cl. B23b 3/28, 13/00
U.S. Cl. 82—14                                    17 Claims

ABSTRACT OF THE DISCLOSURE

A novel automatic lathe is disclosed, said lathe comprising, in combination, a head-stock, a work spindle rotatably mounted at the head-stock and a block turret rotatably mounted at both of its ends and indexable about its axis of rotation. The axis of rotation of the block turret encloses an angle with a plane containing the axis of rotation of the work spindle which is at least 45° and at a maximum 90°. Tool means are carried by the block turret and means are provided cooperating with the block turret for enabling the tool means to be displaced in a direction lengthwise of the axis of rotation of the block turret.

---

The present invention broadly pertains to machine tools and is particularly concerned with an improved automatic lathe.

Automatic lathes are already well known to the art for the economical facing, surface or external machining and internal machining of preferably disk or ring-shaped workpieces, which are charged from the front, that is, from the frontal side during semi-automatic operation. Such type machines either possess a longitudinally movable work spindle and a horizontal or vertical arranged cross slide, or a horizontal compound slide which in this case is situated opposite a work spindle which does not move in longitudinal or lengthwise direction, and wherein such compound slide embodies an upper cross slide and a lower longitudinal slide or carriage. The work spindle in the longitudinally movable head-stock and the associated cross slide, as well as also the cross slide and carriage of the compound slide, are controlled by a respective cam plate or equivalent structure. A number of tools, above all turning or cutting tools, are secured to the cross slide and perform their cutting operation in succession.

The characteristic mode of operation of such type automatic lathes enable each desired workpiece shape to be machined, not by cutting-in or recessing, rather exclusively through lengthwise turning with one or more cutting tools, without having to use complicated and expensive profiling tools. Owing to the simple cutting shapes of the cutting tools, such can be formed of hard metal, allowing for high cutting speeds and corresponding good efficiency. Since typically one cutting tool after the other operates, premature dullness of one or the other cutting tool does not unfavorably affect the machining operation, and therefore, high machining accuracy during continuous operation is ensured.

If the machining of a disk-shaped workpiece without bores is to be finished or else a larger, already preliminary machined, bore at a ring-shaped or annular workpiece, then a transverse travel or path of the cross slide is sufficient which is the same or smaller than the largest radius of the workpiece to be machined, depending upon its form. The cutting tools located out of the range of the cutting operation can assume their momentary idle or ineffectual positions without conflicting with the workpiece itself or its clamping device.

However, as soon as a hole must be bored at a workpiece in addition to facing and external machining, which hole is also still to be turned out, then a considerably larger transverse travel is necessary, otherwise the danger exists that during the metal removal operation with one tool another tool is located in its idle position but not outside of the confines of the workpiece and its clamping device.

In order to be able to finish working the workpiece of FIGURE 1 at the depicted locations including the bore in a chuck or clamping device, for instance formed of a sawn section having a diameter $a=120$ millimeters and a thickness $b=25$ millimeters, by means of the tools W1 to W5 secured upon the cross slide, there must be available a transverse travel or path C of not less than 150 millimeters. Such large transverse travel requires a cross slide which is at least 600 millimeters long. Apart from the large width of the automatic lathe which would therefore then be necessary and the considerable weight of the long cross slide, a large transverse travel has associated with it still other considerable disadvantages. In order to be able to have a transverse travel or path of 150 millimeters the cam plate used for actuating the cross slide must be very large, since during machining of complicated workpieces it must control different idle and work paths, whereby the sum of the herefore required ascents and descents as well as the individual cam slopes results in a minimum size, which presupposes a large average diameter of the cam disk. However, large cam disks for long transverse paths require a great deal of space at the automatic lathe. Apart from this, they are exceptionally expensive, so that their use becomes uneconomical, in contrast to short transverse paths for which the cam control cannot be surpassed.

Further, with horizontal arrangement of the cross slide many of the turnings or chips occurring during machining of the workpiece remain upon the large cross slide surfaces and thus must be removed within short time intervals, particularly in the case of long turnings. If the release and clamping of the workpieces is performed manually, then the repeated removal of the troublesome turnings only results in a correspondingly longer idle time. On the other hand, no trouble-free operation is ensured if the unloading and loading does not take place by hand, rather by a charging device. Oftentimes the use of such a charging device is frustrated solely due to the long turnings or chips which cannot drop with sufficient security.

Long horizontal cross slides are also not advantageous for the reason that they preclude a double spindle construction of the machine as chuck-semiautomatic lathe for manual charging since then there is much too large a spacing between both work spindles. On the other hand, the double spindle construction, however, is the simplest and most economical solution for machining materials producing long chips or turnings. Of course, this presupposes that the double spindle automatic lathe is constructed as compact as possible, so that the operating personnel can easily reach the clamping locations of both work spindles from the front side. During such time as the machining operation takes place at one work spindle, at the other there occurs release and clamping of a workpiece. The charging time is overlapped by the main time and therefore the finishing time is considerably shortened.

A single spindle automatic lathe is already known to the art in which the cross slide is vertical instead of horizontal so as to provide for better depositing of the chips or turnings. However, such arrangement also does not completely fulfill its purpose because, in this case, the tool holders are fastened above one another at the vertically disposed cross slide surface, so that when machining with an upper cutting tool a part of the resulting long turnings unavoidably remains suspended at the cutting tools situated therebeneath as well as at their holders, wherefore the unobstructed dropping of longer chips is still a problem. Additionally, by virtue of the vertical arrangement of the cross slide there is still not overcome the previously mentioned disadvantage of every long transverse path on account of the concomitantly required large cam disks. Moreover, exact adjustment of the individual cutting tools in a vertical plane through the axis of the work spindle is unfamiliar and much more difficult than with horizontal cross slides.

Accordingly, it is a primary object of the present invention to provide a new and improved construction of automatic lathe, for the economical facing, surface and internal machining of preferably disk- or annular-shaped workpieces, which exhibits a large working range and the best possible discharge of long turnings in relation to its transverse path and the small cam disks required for such, and which also in single spindle construction is suitable for use with charging devices as well as also as double spindle machine for manual front charging.

Another noteworthy object of this invention relates to a new and improved construction of automatic lathe requiring relatively short transverse travel for carrying out facing, internal and external machining operations in a highly efficient, trouble-free and precise manner, and providing effective removal of the turnings.

Instead of the previously known cross or compound slides the work spindle is arranged opposite a block turret mounted at both ends, the axis of rotation or revolution of which is located in a plane which is not approximately parallel to the axis of the work spindle, rather generally perpendicular. This block turret moves transversely in its axial direction in accordance with the momentary cross travel and is indexed from one work position into the other in the usual manner. A number of work tools, preferably cuting or shaping tools, are to be fastened to each of the three or four mounting or clamping surfaces of the block turret. Upon completion of their machining work the work spindle or the block turret is retracted, then the turret indexes downwards out of the work area, whereby also large turnings fall into the large chip compartment beneath the work location. After appropriate indexing of the turret the other tools immediately arrive at their proper position with regard to the workpiece to be machined, at which they can begin their machining work without previously having to move through larger idle paths, thereby leading to a favorable production time. The relatively large clamping surfaces of the block turret render it possible to attach each work tool in its position most favorable for carrying out the machining operation. Furthermore, the work tools which, in the meantime, have been indexed away can no longer contact the workpiece or its clamping device. The workpiece depicted in FIGURE 1 is machined in a chuck or setting in accordance with FIGURES 2a, 2b and 2c in three different turret positions, wherein a transverse travel or path $d_3$ (FIGURE 2b) of the block turret of only 50 millimeters is sufficient. In this way, unnecessary idle travel is avoided and, in addition to the favorable discharge of turnings or chips, there is attained a considerably smaller width of the machine which also still renders possible a double spindle construction. Oftentimes it is not necessary to equip all of the clamping surfaces of the block turret with work tools. In such cases, the free surface of the turret is located towards the top during introduction of the workpieces by charging devices or manually, so that they can be clamped and released without obstruction.

Typical automatic turret lathes are already known to the art having star, drum or block turrets. The first is either upright or horizontally arranged and the axis of rotation of the star turret mounted at one end is always perpendicular with respect to the work spindle axis. Feed movement and retraction is performed by the turret slide or saddle carrying the star turret. Now, the drum or cylinder turret is mounted at its surface and generally is moved lengthwise together with all of its work tools which are fastened to the front side of the drum turret. On the other hand, in the case of the block turret which is predominantly mounted at both ends and whose cross section has a many-sided profile, the work tools are directly situated upon the individual side faces or surfaces or arranged upon longitudinal slides arranged thereon and having equally large clamping surfaces. Common to the three basically different turret types is that their feed movement does not take place transverse to the axis of the work spindle rather in its direction, since the guide of the turret slide with the star turret as well as also the axis of rotation of the drum and block turrets are situated parallel to the axis of the work spindle.

Apart from this, sliding tools are already known for turret lathes which are received in the bores of the star turret and moved into their work position transverse to the work spindle axis by the cams for actuating the cross slide. In consideration of the limited space with such type machines the slide or carriage guides for these sliding tools must be of short and narrow construction, whereby they are only suitable for small metal removal and for the accommodation of only few tools which, additionally, are difficult to adjust.

Furthermore, there is known a horizontal turret head mounted for rotation about a vertical axis and arranged upon a compound slide wherein movements of the turret head cannot only be carried out parallel and vertical to the work spindle axis, but also by cooperation of both movements in every optional direction. However, in none of the possible cases is the feed movement carried out in the direction of the axis of rotation of the mentioned turret head.

Accordingly, the present invention contemplates the provision of an automatic lathe having a work spindle rotatably mounted in either a longitudinally movable or stationary headstock, a block turret rotatably mounted at both ends and which can be indexed about its axis of revolution. Characteristic of the invention is the feature that the block turret either together with the thereupon fastened work tools is longitudinally displaceable in the direction of its axis of rotation, or tool slides mounted upon such block turret are displaceable parallel to its axis of rotation, and that such axis of rotation encloses an angle with a plane containing the axis of revolution or rotation of the work spindle which is at least 45° and at maximum 90°.

Other features, objects and advantages of the invention will become apparent by reference to the following detailed description and drawings in which:

FIGURE 1 schematically illustrates a prior art arrangement of workpiece and tool members resulting in a large transverse travel or path;

FIGURE 2 incorporating the FIGURES 2a, 2b and 2c schematically illustrates the shorter transverse travel required for the arrangement of workpiece and tool members of the lathe of the invention;

FIGURE 3 is a partial longitudinal cross-sectional view of a first embodiment of inventive lathe;

FIGURE 4 is a top plan view of the lathe of FIGURE 3, partly shown in cross-section;

Figure 6:
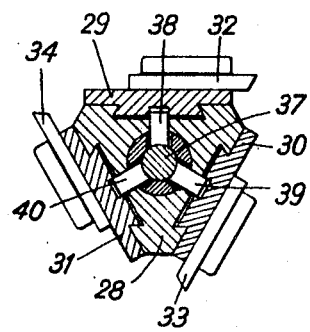
FIGURE 6 is a cross-sectional view of the block turret of FIGURE 5, taken along the line VI—VI thereof.

Describing now the drawings, the exemplary embodiment of automatic lathe schematically depicted in FIGURES 3 and 4 essentially embodies a machine frame 1, the longitudinal or lengthwise movable headstock 2 sliding in a dovetail guide 1a and carrying the work spindle 3. A block turret 4 is supported at both sides or ends in the machine frame 1 and has a horizontal axis of rotation or revolution which crosses at substantially right-angles with a plane containing the axis of rotation of the work spindle 3. This block turret 4 possesses side faces defining three clamping or mounting surfaces 5, 6 and 7 to which cutting tools are affixed, as indicated for instance by reference characters 8, 8a and 9. Of the two coaxial bearing journals 10 and 11 of the block turret 4 the former is displaceably mounted directly at the machine frame 1, the journal 11, on the other hand displaceably in the bore of an indexing-blocking disk 12 mounted rotatably and non-displaceably at the machine frame 1 and with which it is rigidly connected for rotation by a slide wedge or key connection 13. Reference character 14 designates a switching or indexing mechanism which in known manner can, for example, incorporate a small electric drive motor and a standard Geneva movement or Maltese cross drive, driven by such. At the periphery of the blocking disk 12 there are provided notches or grooves 15, 16 and 17 for locking the block turret by means of an appropriate locking bolt 18 or equivalent structure after such turret has been indexed through 120° in clockwise direction.

For the turning or machining of end faces the block turret 4 is positively moved transversely in the direction of tool feed by means of a double-arm lever 19. The latter engages practically without play at one end in an annular groove 20 provided at the journal 11 and at its other end carries a roller 21 riding upon the circumference of a cam disk 22. This cam disk 22 is seated upon a control shaft 23 at which there is also mounted a cam disk 24 which positively moves the headstock 2 via a double-arm lever 25 lengthwise in a direction towards the cutting tools. Return of the block turret 4 and the headstock 2 in each instance is undertaken by means of suitable springs.

Beneath the actual work station of the automatic lathe and between the cutting tools 8 and 8a depicted in their work position and the workpiece to be machined there is located a large chip- or turning-receiving compartment 27 into which the resulting turnings or otherwise already during the machining operation can unobstructedly fall, or upon indexing of the block turret 4 are projected therein.

Figure 5:
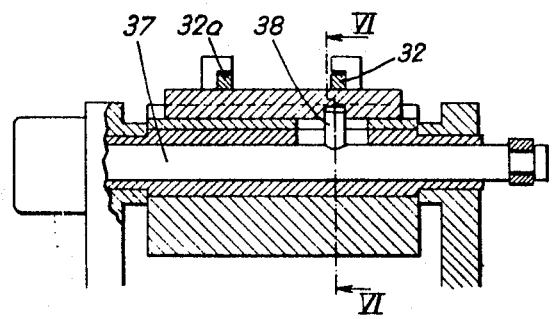
FIGURE 5 is a longitudinal cross-sectional view of a variant of block turret capable of use with the lathe of FIGURES 3 and 4.

FIGURES 5 and 6 depict a first variant of block turret. At each side face or surface of the turret body 28 there is arranged a respective tool slide or carriage 29, 30 and 31 longitudinally movable in the direction of the axis of rotation of such turret. Suitable cutting tools, such as indicated at 32, 32a, 33 and 34 are affixed to these tool slides 29, 30 and 31 respectively. In this case, the turret body 28, rotatably mounted at both ends in the machine frame 1, itself does not undertake any axial movement, rather only performs the turret indexing movement from one work position into the other. Similar as in the case of the block turret 4 of the embodiment of FIGURES 3 and 4, here also all three tool slides 29, 30 and 31 are commonly moved at right-angles to the work spindle in accordance with the momentarily required work paths. This movement is carried out by means of a rod 37 centrally arranged at the turret body 28 and the entrainment members 38, 39 and 40, each of which engages in an appropriate recess, as shown, provided at the associated tool carriages 29, 30 and 31 respectively. Actuation of the rod 37 by the control cam takes place in the same manner as for the block turret 4 of the embodiment of FIGURES 3 and 4.

Figure 7:
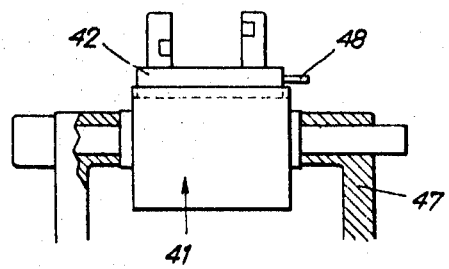
FIGURE 7 is a front view of a further embodiment of block turret, partly shown in cross-section.
Figure 8:
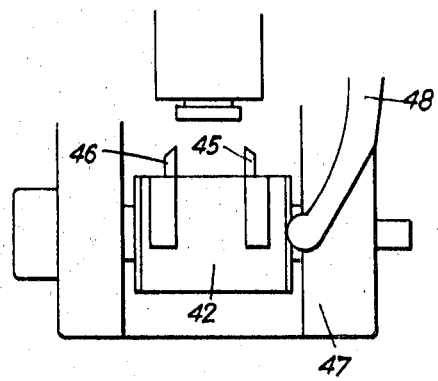
FIGURE 8 is a fragmentary top plan view of the block turret of FIGURE 7.

In FIGURES 7 and 8 there is depicted a variant construction of block turret 41 at whose three side faces or surfaces there are guided the tool slides or carriages 42. Upon the latter there are mounted work tools, as for instance the cutting tools 45 and 46. Block turret 41 is rotatably mounted at both ends and in axial direction free of play in the machine frame 47. It only carries out the indexing motion. The tool carriage 42 which is temporarily located in its work position is displaced by means of the lever unit 48, corresponding to the lever 19 of the embodiment of FIGURES 3 and 4.

It is by no means absolutely required that the block turret only carry out transverse movement and the work spindle longitudinal movement. On the contrary, it is equally possible that the work spindle is not axially lengthwise movable and therefore, there is provided a special longitudinal slide or other longitudinally movable support element upon which the block turret is mounted at both ends, so that the latter can carry out movement in its axial direction as well as also axial lengthwise movement. In this instance, the machine works to a certain extent like the compound slide situated opposite the work spindle of the previously known automatic lathes for front operation.

Figure 9:
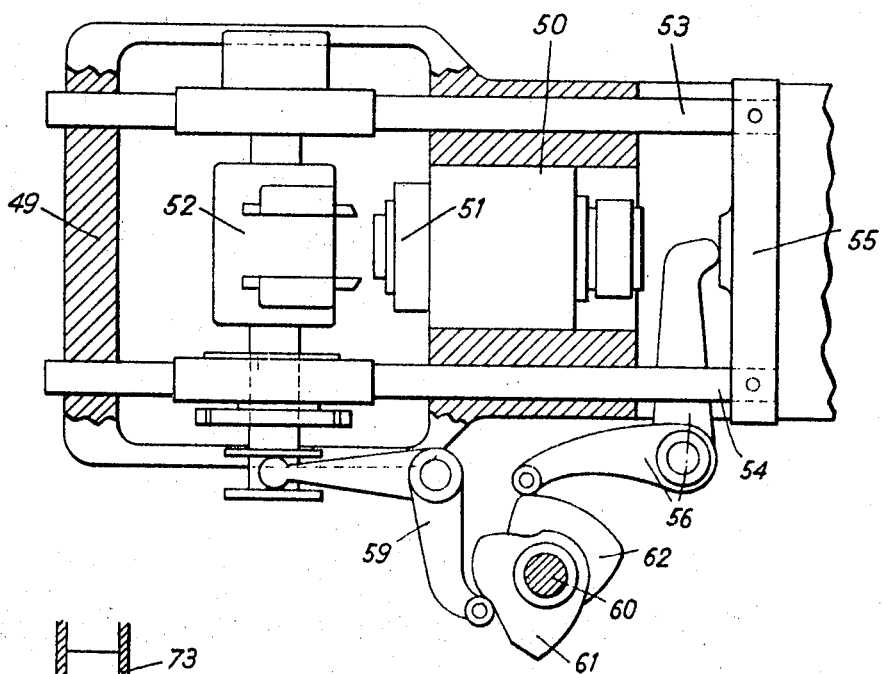
FIGURE 9 is a top plan view, partly in horizontal cross-section, of a second embodiment of inventive lathe.

More specifically, in the embodiment of automatic lathe schematically depicted, by way of example, in FIGURE 9 such essentially embodies the frame-shaped machine frame 49, the non-longitudinally movable headstock 50 provided with the work spindle 51 and the oppositely situated block turret 52. The latter is mounted at each end in longitudinal or lengthwise movable rods 53 and 54 which, in turn, are guided at the machine frame 49. At the rear end of the machine both of these rods 53 and 54 are rigidly interconnected by means of a crossbar or yoke 55. An angle lever arrangement 56 presses against this crossbar 55 in the feed direction of the work tools if shoulders are lengthwise turned or bores are to be turned out or machined. Mounting of the block turret 52 at both ends in the rods 53 and 54 is carried out in like manner as in the embodiment of FIGURES 3 and 4 with respect to the mounting of the block turret 4 at the machine frame 1. In analogous manner the same means can be employed for indexing and locking the block turret 52, which is transversely moved for turning or machining of end faces by means of a cam-controlled angle lever 59. Fastened to the vertical control shaft 60 are both cam disks 61 and 62, by means of which the turret can be controlled in transverse and lengthwise direction of the work spindle 51.

Figure 10:
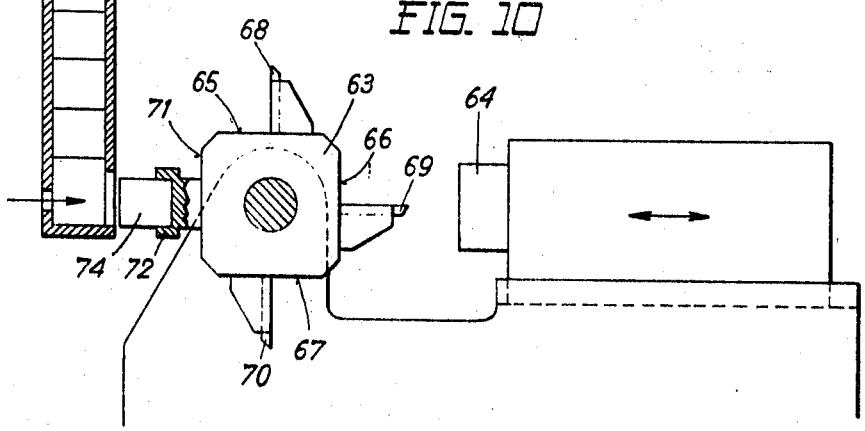
FIGURE 10 is a fragmentary elevational view of a variant construction of inventive lathe in which the block turret is employed for loading or charging the work spindle.

In the previously described exemplary embodiments of inventive automatic lathe the axis of the block turret is situated perpendicular to the work spindle axis, yet beneath such. Consequently, the work tools fastened to the upper situated mounting or attachment surface are readily accessible and, apart from such, there is provided good visual access to the work location. After completion of a machining operation the work spindle or the block turret must, however, be more or less retracted before indexing of the turret can begin. In order to avoid such idle paths, in the embodiment of machine tool depicted in FIGURE 10, the axis of the block turret 63 is at the same elevation as the axis of the work spindle 64. The cutting or shaping tools 68, 69 and 70 are fastened to the clamping or screw-on surfaces 65, 66 and 67 respectively, and at the fourth clamping surface 71 there is seated a receiver 72 into which there is pushed, by suitable non-illustrated means, the lowermost workpiece 74 located in a delivery channel or supply magazine 73. After the block turret 63 has been indexed twice, receiver 72 is located opposite the work spindle 64 and delivers to the clamping device of the latter the workpiece 74 which is to be machined. This arrangement of the block turret 63 together with the described automatic delivery of the workpieces has the advantage that the time is shorter for automatic charging or loading, because transfer of the workpiece 74 from the delivery channel 73 into the receiver 72 is possible during such time as, for instance, a hole is being bored at a workpiece.

Figure 11:
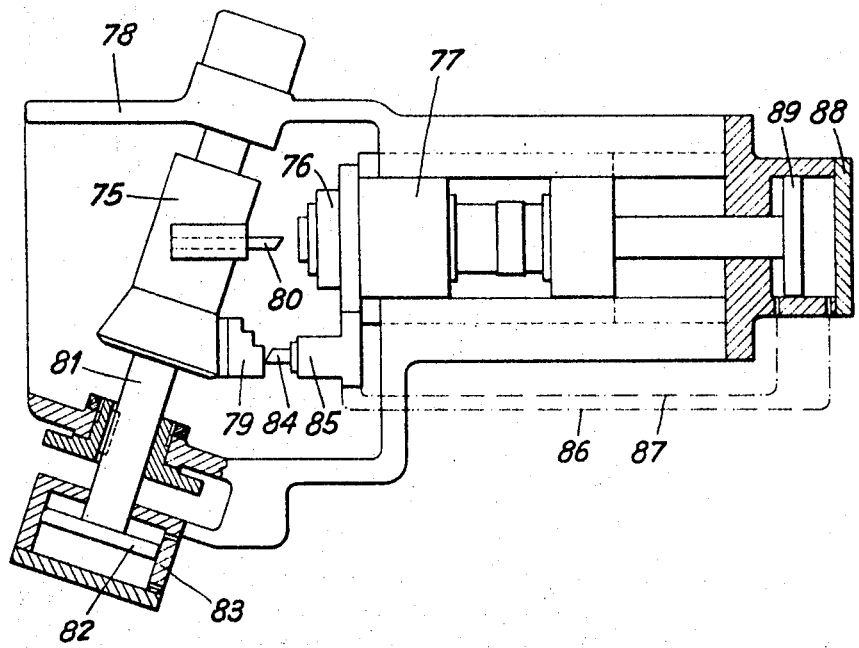
FIGURE 11 is a top plan view, partly in horizontal cross-section, of an embodiment of lathe in which the transverse movement of the block turret is not effected by cam disks, rather hydraulically.

FIGURE 11 depicts a further embodiment of automatic lathe which does not employ any cam disks. In this case, the axis of rotation or revolution of the block turret 75 is located at an inclination to the axis of the work spindle 76 aranged in the lengthwise movable headstock 77. Here again, the block turret 75 is displaceably mounted at both ends for movement along its axis and rotatably in the machine frame 78. A copying template 79 as well as the cutting tool 80 are fastened to at least one clamping surface of the block turret 75 and which work the workpiece at the surfaces accentuated with a thickened line. A suitable hydraulic drive is employed for the lengthwise displacement of the block turret 75. This hydraulic drive incorporates a piston 82 mounted to the block turret body 81 and working in a cylinder 83 secured to the machine frame 78. The feeler 84 of a copying control device 85 of standard construction regulates the influx and efflux of control liquid through schematically indicated conduits 86, 87 to the two compartments of a copying servo-cylinder 88 in which operates a piston 89 rigidly connected with the headstock 77. During turret indexing the copying device is always blocked. Of course, as previously developed, it is also conceivable to provide the block turret with tool slides.

A variant construction would be readily possible in which instead of the movements of the headstock and the work spindle those of the block turret along its axis are tracer- or copy-controlled; in one or the other case and with the pre-condition that there is used a commercially available copying device suitable for such purpose, the axis of the turret could be arranged perpendicular to the axis of rotation of the work spindle.

In every case, the axis of revolution or rotation of the block turret should enclose an angle with a plane containing the axis of rotation of the work spindle which is at least 45° but at a maximum 90°.

While there is shown and described present preferred embodiments of the invention, it is to be distinctly understood that the invention is not limited thereto but may be otherwise variously embodied and practised within the scope of the following claims.

What is claimed is:
1. Automatic lathe comprising, in combination, a headstock, a work spindle rotatably mounted at said headstock, a block turret possessing a number of side faces and rotatably mounted at both of its ends and indexable about its axis of rotation, tool means carried by said block turret, at least some of said side faces carrying a plurality of tools, means cooperating with said block turret for enabling said tool means to be displaced in a direction lengthwise of the axis of rotation of said block turret, said axis of rotation of said block turret enclosing an angle with a plane containing the axis of rotation of said work spindle which is at least 45° and at maximum 90°.

2. Automatic lathe as defined in claim 1, wherein said enabling means comprises means mounting such block turret together with said tool means carried thereon for longitudinal movement in a direction along said axis of rotation of said block turret.

3. Automatic lathe as defined in claim 1, wherein said enabling means comprises tool slides for directly supporting said tool means and displaceably mounted on said block turret for movement substantially parallel to said axis of rotation of said block turret.

4. Automatic lathe as defined in claim 1, wherein said headstock is stationarily mounted.

5. Automatic lathe as defined in claim 1, further including means mounting said headstock for lengthwise movement.

6. Automatic lathe as defined in claim 1, wherein said axis of rotation of said block turret is substantially horizontal.

7. Automatic lathe as defined in claim 6, wherein said block turret possesses a number of side faces, a supply magazine for workpieces, a workpiece receiver provided at one of said side faces which in a location facing away from said work spindle is capable of receiving a workpiece to be machined from said workpiece supply magazine and upon rotatable indexing of said block turret through about 180° moves the received workpiece into a position for transfer to said work spindle.

8. Automatic lathe comprising, in combination, a headstock, a work spindle rotatably mounted at said headstock, a block turret rotatably mounted at both of its ends and indexable about its axis of rotation, tool means carried by said block turret, means cooperating with said block turret for enabling said tool means to be displaced in a direction lengthwise of the axis of rotation of said block turret, said axis of rotation of said block turret enclosing an angle with a plane containing the axis of rotation of said work spindle which is at least 45° and at maximum 90°, said axis of rotation of said block turret being substantially horizontal and located beneath said axis of rotation of said work spindle.

9. Automatic lathe as defined in claim 8, further including a machine frame, said block turret being directly mounted at said machine frame.

10. Automatic lathe as defined in claim 8, further including a machine frame, a rigid supporting unit mounted at said machine frame for displacement substantially parallel to the axis of rotation of said work spindle, said block turret being mounted at said supporting unit.

11. Automatic lathe as defined in claim 8, further including a machine frame, said block turret having a number of side faces, a copying template carried at one side face of said block turret, said one side face also carrying at least one of said tool means, said block turret and associated copying template and said one tool means as well as said work spindle providing respective displaceable units, drive means for imparting continuous movement during machining to at least one of said displaceable units, copying means located at said machine frame, said copying means including a feeler for scanning said copying template and imparting a corresponding movement to at least the other of said displaceable units.

12. Automatic lathe as defined in claim 11, wherein said one displaceable unit to which there is imparted continuous movement by said drive means comprises said block turret and associated copying template and at least one tool means.

13. Automatic lathe as defined in claim 11, wherein said other displaceable unit to which there is imparted said corresponding movement by said copying means comprises said work spindle.

14. Automatic lathe as defined in claim 1, wherein said block turret incorporates a plurality of side faces, said enabling means comprising a number of tool slides, each one of which is displaceably mounted at a given one of said side faces, means for conjointly actuating said tool slides, said actuating means including a rod member piercingly extending coaxially of said block turret.

15. Automatic lathe comprising, in combination, a headstock, a work spindle, means for rotatably mounting said work spindle at said headstock, a block turret, means for rotatably mounting said block turret at both of its ends so as to be indexable about its axis of rotation, said block turret possessing a number of side faces, a plurality of tool means carried by at least some of said side faces of said block turret, means cooperating with said block turret for enabling said tool means to be displaced in a direction lengthwise of the axis of rotation of said block turret, said axis of rotation of said block turret enclosing an angle with a plane containing the axis of rotation of said work spindle which is at least 45° and at maximum 90°, said axis of rotation of said block turret being substantially horizontal and located beneath said axis of rotation of said work spindle.

16. Automatic lathe comprising, in combination, a headstock, a work spindle, means for rotatably mounting said work spindle at said headstock, a block turret possessing a number of side faces, means for rotatably mounting said block turret at both of its ends to render same indexable about its axis of rotation through an angle of 360°, a plurality of tool means carried by at least one of said side faces of said block turret, means cooperating with said block turret for enabling said tool means to be displaced in a direction lengthwise of the axis of rotation of said block turret, said axis of rotation of said block turret enclosing an angle with a plane containing the axis of rotation of said work spindle which is at least 45° and at maximum 90°.

17. Automatic lathe comprising, in combination, a headstock, a work spindle, means for rotatably mounting said work spindle at said headstock, a block turret, means for rotatably mounting said block turret at both of its ends to render same indexable about its axis of rotation through an angle of 360°, tool means carried by said block turret, said tool means carried by said block turret comprises two working tools, means cooperating with said block turret for enabling said tool means to be displaced in a direction lengthwise of the axis of rotation of said block turret, said axis of rotation of said block turret enclosing an angle with a plane containing the axis of rotation of said work spindle which is at least 45° and at maximum 90°.

References Cited

UNITED STATES PATENTS

| | | | |
|---|---|---|---|
| 1,305,473 | 6/1919 | Lawrence | 29—54 |
| 1,527,791 | 2/1925 | Flanders | 29—54 |
| 1,690,541 | 11/1928 | Kuzelewski | 82—2.7 |
| 3,162,926 | 12/1964 | Schwendenwein | 29—44 |
| 3,287,792 | 11/1966 | Kummer | 29—54 |

FOREIGN PATENTS

| | | |
|---|---|---|
| 116,282 | 5/1919 | Great Britain. |
| 147,365 | 10/1954 | Sweden. |
| 369,644 | 7/1963 | Switzerland. |
| 639,754 | 7/1950 | Great Britain. |

GERALD A. DOST, Primary Examiner

U.S. Cl. X.R.

29—44, 54; 82—2, 21